F. BILHARZ.
HOOK AND EYE OR COLLAR SUPPORTER AND STIFFENER.
APPLICATION FILED DEC. 17, 1908.
926,539.
Patented June 29, 1909.
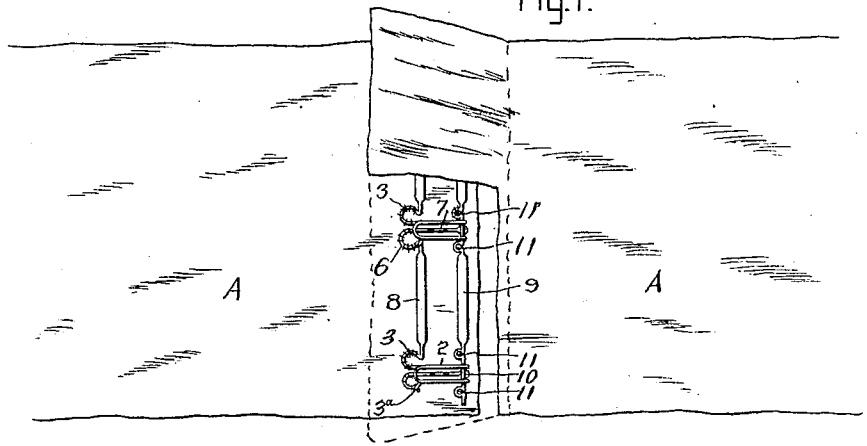
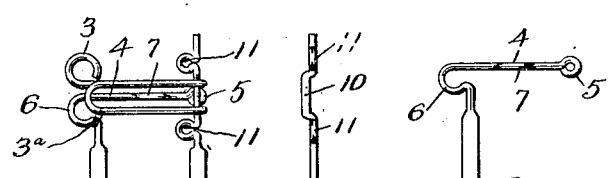
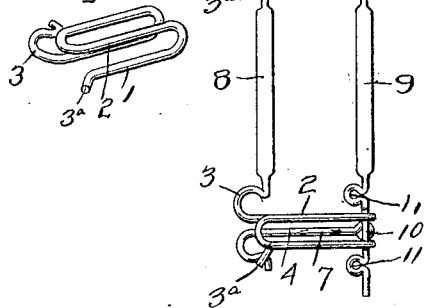

UNITED STATES PATENT OFFICE.

FANNIE BILHARZ, OF WINSTON SALEM, NORTH CAROLINA.

HOOK AND EYE OR COLLAR SUPPORTER AND STIFFENER.

No. 926,539.     Specification of Letters Patent.     Patented June 29, 1909.

Application filed December 17, 1908. Serial No. 468,036.

*To all whom it may concern:*

Be it known that I, FANNIE BILHARZ, a citizen of the United States, residing at Winston Salem, in the county of Forsyth and State of North Carolina, have invented certain new and useful Improvements in Hooks and Eyes or Collar Supporters and Stiffeners; and I do declare the following to be a full, clear and exact description of the invention, such as will enable others skilled in the art to which it appertains to make and use the same, reference being had to the accompanying drawings, and to the figures of reference marked thereon, which form a part of this specification.

My invention relates to a combined hook and eye and stiffener or collar supporter.

It has for its object to so construct the hook and eye that the hook will have a centrally disposed member interposed between the parallel side members of the hook, it being made of a separate piece having an eye at its end next to the base of the hook and its opposite end adapted to be connected to one of the loops or eyes formed at the ends of the side members at the point or nose of the hook, and preferably formed with a hump between its ends.

It has also for its object to join one hook with another by a connecting member so that the connecting member will serve as a stiffener, thus enabling the hooks and connecting member to serve also as a collar supporter.

To the accomplishment of the foregoing and such other objects as may hereinafter appear, the invention consists in the features hereinafter particularly described and then sought to be clearly defined by the claims reference being had to the accompanying drawing forming a part hereof, and in which—

Figure 1 is a side view of the improved hook and eye and stiffener or supporter applied to a collar, or fabric; Fig. 2 a side view of the combined hook and eye and stiffener or supporter; Fig. 3 an edge view of the eye strip; and Fig. 4 a side view of sections of the hook and eye and stiffener, the sections being separated or detached, to clearly illustrate the construction of the separate sections, and Fig. 5 is a perspective view of one of the hooks. Figs. 2, 3, 4 and 5 are on an enlarged scale.

In the drawing, the numeral 1 designates the parallel side members of the hook and 2 the tongue or beak of the hook, one side member being formed with an eye or loop 3 at its end next to the point or nose of the tongue, and the end $3^a$ of the other member capable of being formed into an eye or made to clasp the third or interposed member of the hook. This third or interposed member of the hook is designated by the numeral 4 and is positioned between the parallel side members 1, and at its end next to the base or loop of the tongue is formed with an eye 5 and at its opposite end is formed with a loop or eye 6 to which the end $3^a$ of one of the side members will be connected by bending it around a portion of the eye 6, or otherwise causing it to clasp the same. The interposed member 4 is preferably formed between its ends with a hump 7. A number of the hooks are connected together by strips or wires 8 which in connection with the hooks will serve as stiffeners and these wires are preferably flattened in cross section so as to afford stiffness and at the same time give to them some degree of flexibility. These connecting members are formed integral with the hooks at one end and with the interposed member for the hook at the other end as indicated in Fig. 4 of the drawing.

With the parts formed as shown in Fig. 4 and assembled as shown in Fig. 2, the adjacent ends of the two sections form the completed hook by having the member 4 of one section positioned between the side members 1 of the other section, and one of said members having its end $3^a$ looped or clasped around the eye or loop 6 of the interposed member as indicated in Fig. 2. The hook at one of the other ends of the assembled parts is completed by positioning the intermediate member 4 between the side members 1 of the tongue member and connecting the intermediate member to one of the side members as in the middle hook, and the hook at the other end is completed by associating with the tongue member at that end one of the interposed members 4 and connecting it to the tongue member as indicated in Fig. 2. It will be observed that for the end hooks, the tongue member is made without a connecting stiffening member 8, and that the intermediate member 4 for the hook at the other end is made without a connecting stiffener 8. The parts however are furnished in sets comprising a hook member and an intermediate member formed without the stiffener, and sections having a hook member at one end and an intermediate member at the other end integral with the stiffener members. This enables the parts to be assembled in the manner indicated, and to any length desired, the separate hook and intermediate members being applied at the ends.

The eye member of the hook is formed of a strip 9 preferably flattened in cross section and formed at intervals with loops 10 for the hooks to engage with and with eyes 11 for attachment to the garment or article of wearing apparel, and will be made up in the lengths desired. It will be observed that by connecting the hooks by the stiffening strips the parts when assembled have the necessary stiffness for close fitting, there being sufficient flexibility in one direction to allow for movement conforming to movements of the body. This also provides a collar supporter as the connecting wires or strips afford the requisite stiffness to support a collar when used in connection therewith; and any desired number of the sections may be employed according to the depth of collar worn.

It will also be observed that the eyelets 11 of the eye member are on the side toward the attaching eyelets of the hook member so that when the hook and eye are attached to the garment or collar said eyelet, as well as other parts of the two members, are concealed from view beneath the fabric instead of parts of the eyelets being exposed at the edge of the fabric.

In Fig. 1 of the drawing the combined hook and eye and stiffener is shown applied to a fabric A which may represent either a part of a garment or collar. The device will be attached by threads applied through the several eyes or loops and also around the bend or loop at the base of the hook so that the hook will be securely held to the garment or collar without liability of the hook sliding or turning in either direction.

I have described with particularity the preferred details of the several parts but it is obvious that changes may be made in some of the features without departing from the essential features of the invention.

Having described my invention, and set forth its merits, what I claim is:—

1. A hook comprising parallel members having a bent up portion forming a tongue, and a member interposed between the parallel members, said interposed member having an eye at the base of said tongue and a loop at its opposite end connected with one of said parallel members, the other parallel member being formed with an eye or loop at its end, substantially as described.

2. A combined hook and stiffener or collar supporter formed of parallel members having a bent-up portion forming a tongue, and a member interposed between the parallel members, said interposed member having an eye at the base of said tongue and a loop at its opposite end connected with one of the parallel members, the other parallel member being formed with an eye or loop at one end, and stiffening members extending in opposite directions and laterally from the parallel members, substantially as described.

3. A combined hook and stiffener or collar supporter composed of stiffening members assembled in pairs, each formed at one end with parallel members bent-up to form a tongue and at the other end with a member extending parallel to said tongue, said stiffeners being assembled with the member at the end of one stiffener interposed between the parallel members of the adjacent end of the other stiffener, substantially as described.

4. The combined hook and stiffener or collar supporter consisting of a hook member and flattened stiffening members extending in opposite directions therefrom, substantially as described.

5. The combined hook and stiffener or collar supporter consisting of a series of hook members and a connecting flattened stiffening member, substantially as described.

6. The combined hook and stiffener or collar supporter consisting of a series of hook members and a connecting flattened stiffening member, and an eye member consisting of a strip formed with eyes for engagement of the hook members therewith, substantially as described.

7. A combined hook and stiffener or collar supporter consisting of a series of hook members connected by stiffening members and formed with eyes to one side of the hook member for the passage of attaching threads, and an eye member consisting of a strip formed with eyes for engagement of the hook members therewith and having eyes to one side of the hook engaging eyes for the passage of attaching threads, substantially as described.

8. The combination hook and eye consisting of a hook member having eyelets for attaching threads, and an eye member having eyelets for attaching threads on the side thereof toward the eyelet portion of the hook member whereby all parts of the hook and eye members are concealed when applied, substantially as described.

In testimony whereof I affix my signature in presence of two witnesses.

FANNIE BILHARZ.

Witnesses:
J. F. BROWER, Jr.,
H. B. PULLIAM.